United States Patent [19]

Rasmussen et al.

[11] 3,820,450
[45] June 28, 1974

[54] PEPPER STATION
[75] Inventors: Carl E. Rasmussen, Atwater; George O. Tiura, Modesto, both of Calif.
[73] Assignee: Agmac Inc., Ripon, Calif.
[22] Filed: Oct. 2, 1972
[21] Appl. No.: 294,272

[52] U.S. Cl.................................. 99/643, 99/546
[51] Int. Cl............................................. A23n 15/04
[58] Field of Search............ 99/546, 567, 635, 637, 99/643

[56] References Cited
UNITED STATES PATENTS
2,638,949  5/1953  Blevins, Sr. et al.................. 99/643
2,801,662  8/1957  Brunnier.............................. 99/643
3,354,923  11/1967 Voller............................... 99/637 X Primary Examiner—Leon G. Machlin
Attorney, Agent, or Firm—Lothrop & West

[57] ABSTRACT

For treating peppers, such as chili peppers, a stationary or portable machine is provided. An inclined shaking table is mounted on the machine to receive combined pepper portions and stem portions that have been harvested from the growing plant. Upstanding from the table are one or more obstructions in the path of advance of the material adapted to halt such advance momentarily while a knife, in cooperation with the obstruction, severs the stem portion to leave the pepper portion virtually free thereof. The passing materials are subjected to various air blast and gravity drop cleaning operations and are finally presented to a selecting table having a return for materials that need to be reprocessed and discharging selected materials for further handling while conveying reject materials to a suitable point.

16 Claims, 9 Drawing Figures

PEPPER STATION

In the harvesting of peppers of various sorts from the bush or vine on which they grow in the field, it has generally been customary to pick the peppers by hand making sure that only a short portion of the stem accompanies the pepper itself for the reason that preservers or canners require a limited stem length for their purposes. In most varieties of peppers, such as chili peppers, jalapenos and even bell peppers, the stem is firmly attached to the pepper itself. There is not an easy detachment upon picking. Resort must normally be had to cutting the stem in order to separate the pepper from the vine or bush. Recently, some success has been had in harvesting peppers by utilizing a revised snap bean harvester. This is effective to remove the pepper together with a fairly large proportion of stem material along with leaves and the like. Since the pepper vines or bushes grow quite close to the ground and yield many of the peppers near to the ground, the harvesting machine necessarily picks up along with the peppers and stems a fairly large proportion of earth, rocks, sticks and miscellaneous field debris. The material furnished by the machine harvester is inclusive of a satisfactory proportion of peppers and stems but is also inclusive of an unwantedly large proportion of miscellaneous debris, both light, such as leaves, and heavy, such as rocks. Occasionally, the harvesting takes place when the ground is still wet or muddy and intermixed clods may be in the form of mud pellets and the like. The materials or agglomerates as described and as harvested are by no means satisfactory for sale to the processor.

It is therefore an object of our invention to provide a machine for separating the peppers themselves from the miscellaneous debris which may accompany their harvest and particularly for supplying the peppers with a minimum amount of attached stem, usually not to exceed a stem 4 inches long.

Another object of the invention is to provide a machine which will effectively separate peppers and pepper stems of a limited length from miscellaneous accompanying debris without substantially harming a large portion of the peppers.

Another object of the invention is to provide a pepper handling machine that will automatically accept debris harvested by a pepper harvester and separate it into materials which are retained for special selecting and other materials which are discarded.

A further object of the invention is to provide a pepper handling machine that readily can be adapted to handle peppers in various stages of growth; that is, whether green or dry, and will accommodate peppers and pepper vines or stems of various different sizes.

Another object of the invention is in general to provide a machine which will beneficiate the harvest of a pepper harvester.

Other objects together with the foregoing are attained in the embodiments of the invention described in the accompanying description and illustrated in the accompanying drawings, in which.

Figure 2:
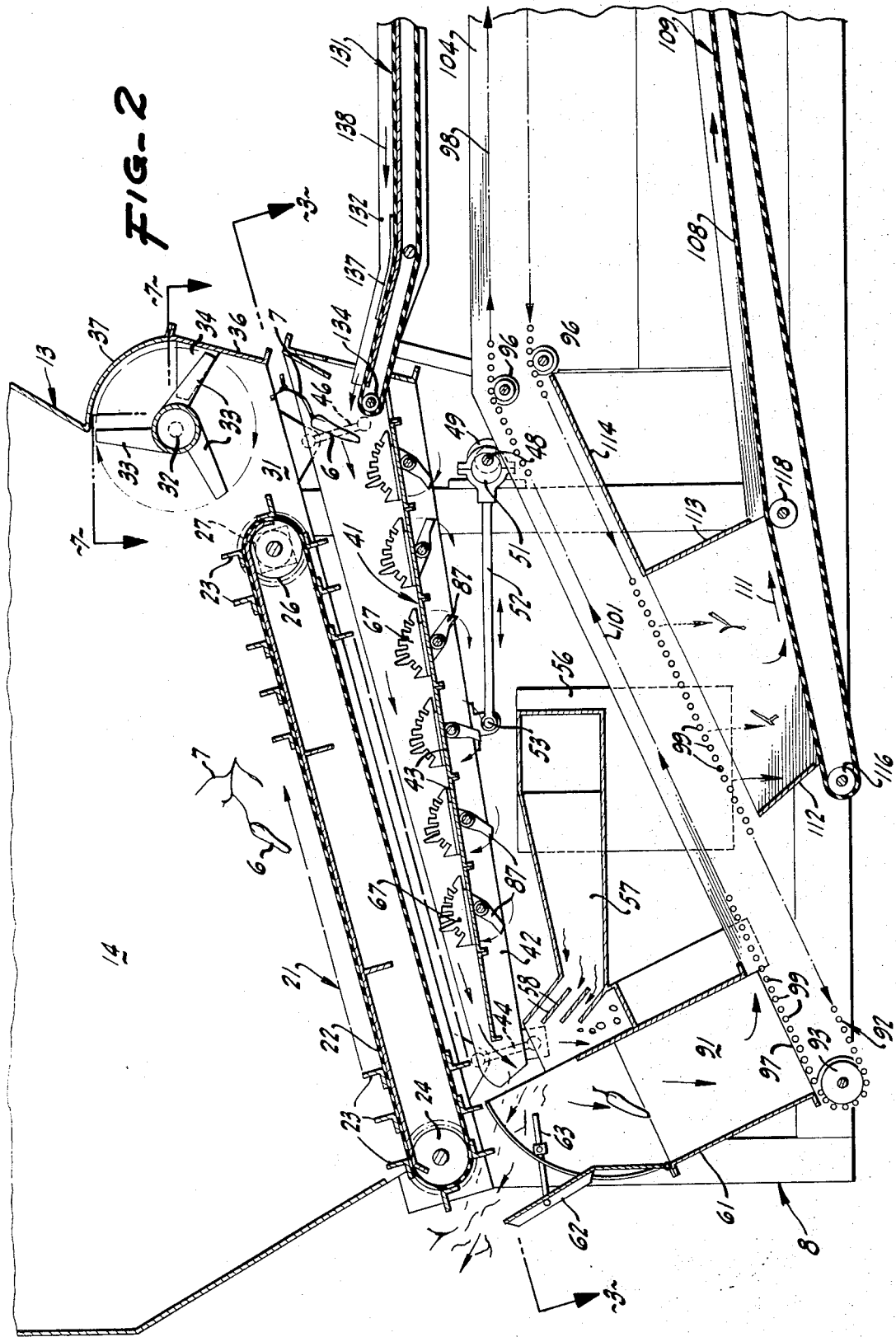
FIG. 2 is a cross-section to an enlarged scale on a vertical longitudinal plane through the separating portion of the machine.

A typical result of a chili pepper harvesting operation is as shown schematically in FIG. 2. This includes a pepper portion 6 that is approximately an inch to 1½" in diameter and some 6 or 8 inches long in an approximately circular, tapered form. Harvested with the pepper portion is a stem portion 7 united to the pepper portion by a firmly affixed cap and constituting a branched and leaved member of considerable extent. The pepper varies, depending upon harvest time, from a relatively soft, green, tender fruit to a relatively hard, even partially shriveled object when it has been permitted to dry and often changes color from green to red. The jalapeno peppers are usually somewhat shorter and rounder than the chili peppers, whereas bell peppers are much shorter usually and considerably larger in diameter. In most instances, however, the diameter of the stem portion 7 in the vicinity of the cap is approximately an eighth to a quarter inch in diameter. The pepper portion may be an inch and a half or so in approximate diameter.

Since it is possible to utilize a single pepper handling machine for several pepper harvesters operating in the field, we provide a vehicle which can be transported over the roadway and in the field or can be established in any one fixed location with respect to the harvesting operation. For that reason we provide a main frame 8 constructed of the customary shapes, angles, and braces supported on road wheels 9 and having a tongue 10 that can be utilized as a towing member and also as a support when it rests on an appropriate jack 11 or block in a set location.

Included in the frame 8 is a superstructure 12 affording a support for an appropriate hopper 13 established at an appropriate height on the frame 8. Since the capacity of the hopper is relatively large and its height might be excessive for highway transport purposes, we preferably form the the hopper with some stationary sides 14 and some extended sides 16. The latter are connected to the stationary sides by hinges 17. In use four sides of the hopper are extended upwardly. When required, the sides 16 can be lowered so that the hopper height is no greater than that of the hinge line.

In use, the mobile pepper harvesters supply their gleanings to the hopper 13. Received are peppers and attached stems, rocks, pebbles, miscellaneous debris, earth, clods, perhaps mud or mud balls, leaves and comparable detritus. This is all retained in the hopper and tends by gravity to settle toward the lower, rearward (left in FIG. 2) portion of the hopper.

In order to advance the harvested materials in the hopper for treatment, the hopper sides converge toward the hopper bottom. Disposed in the bottom is a conveyor 21 including an appropriate framework and a belt 22 having upstanding cleats 23 thereon. The conveyor is supported on drums 24 and 26 preferably driven by a hydraulic motor 27. Like the rest of the drives in the structure, the motor 27 is supplied with hydraulic fluid under pressure from a suitably controlled pump 28 driven by an internal combustion engine 29 on the frame.

In operation, the advancing conveyor 21 causes interengagement of the cleats 23 with materials in the hopper 13 and advances all of the received materials toward the leading end of the machine and toward an outlet 31. The outlet is defined generally by the space between the upper end of the advancing belt 22 and the forward wall of the hopper 13.

In order initally to prepare some of the harvested material at this point, there is mounted to span the hopper 13 a transverse, rotary shaft 32 suitably mounted and driven. The shaft carries a number of radial blades 33 revolving in cooperation with a plurality of stationary blades 34 projecting rearwardly from the forward wall 36 of the hopper. The assembly of the blades 33 is partially housed by an arcuate cover 37. The blades 33 are revolved in a clockwise direction, as seen in FIG. 2, and serve initially to sever some of the longer stems or branches of the pepper plant so that they can travel easily through the outlet 31 and so can discharge from the hopper 13 in amounts somewhat regulated by the operation of the severing means or blades 33. Some materials do not pass in the vicinity of the blades but are simply discharged by gravity over the upper end of the advancing belt 22 and through the outlet. A representative amount of material from the hopper travels through the outlet and falls by gravity.

Particularly pursuant to the invention, all of the material discharged in this fashion from the hopper 13 is discharged onto and is received by a moving, rearwardly and downwardly inclined table 41. This table in made up of parallel side members, such as 42, spanning which are shallow channels 43, preferably of metal, making up a series of units together constituting a planar surface that in use becomes polished for a low coefficient of friction. The table side members 42 are suspended by links 44 and 46 (FIGS. 1 and 2) so that the table can swing or partake of an approximately rectilinear reciprocation, there being a slight arcuate motion, so that the table operates substantially parallel to itself in all of its displaced positions.

Figure 3:
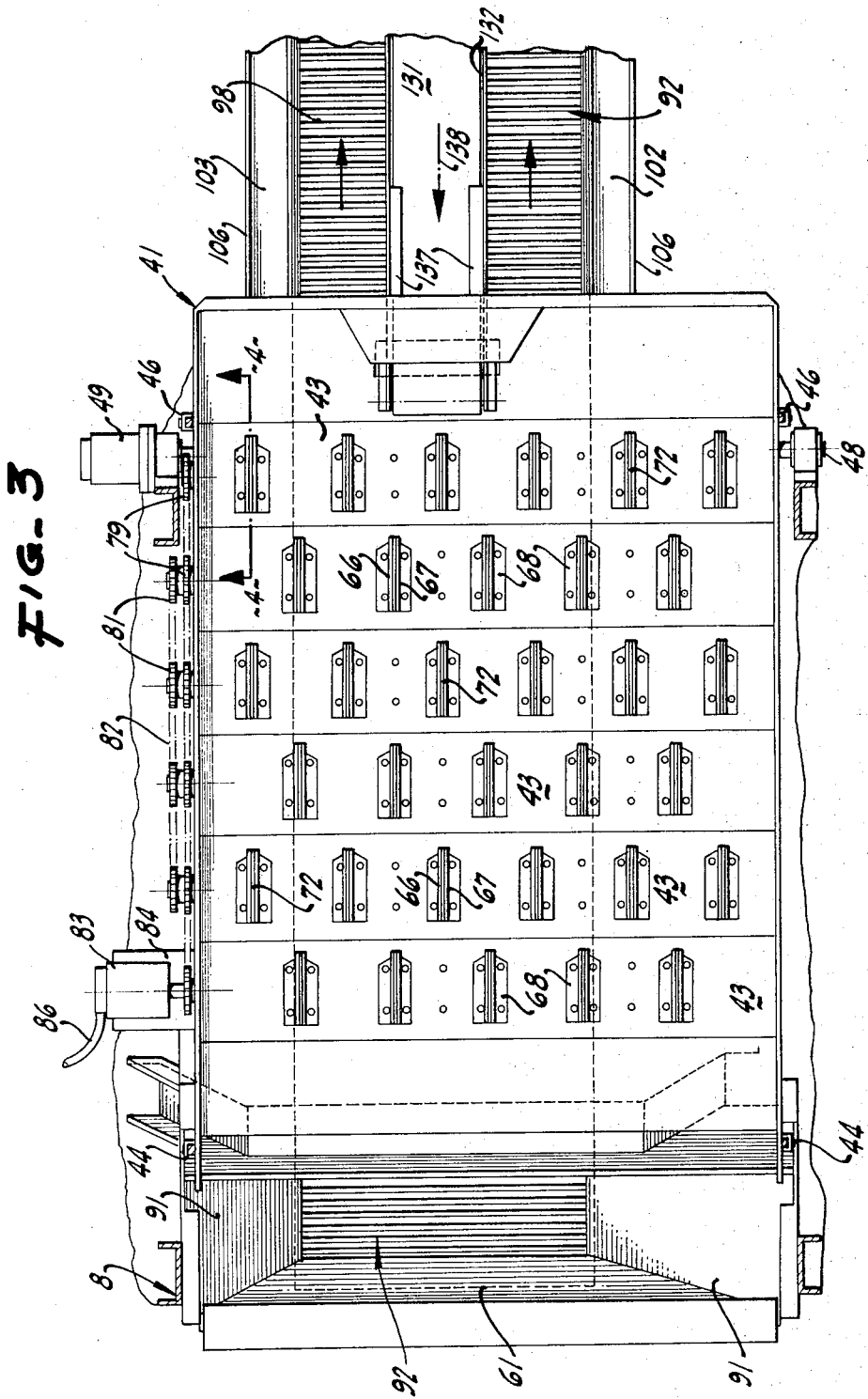
FIG. 3 is a cross-section, the plane of which is indicated by the line 3—3 of FIG. 2.

So that the table will operate cyclically in the indicated fashion, there is afforded a drive shaft 48 mounted on the frame 8 and impelled by a hydraulic motor 49 (FIG. 3) driven from the power source 28 and operating at any selected speed. The shaft 48 carries a pair of eccentrics 51 at either end, each of which is connected to one of a pair of connecting rods 52 secured to anchor pins 53 on the side members 42 of the table.

When the motor 49 is energized, the table 41 is reciprocated or shaken. Materials falling from the outlet 31 onto the table are first impelled rearwardly and downwardly and then are arrested by an upward and forward movement. In some respects the oscillatory movement has substantial effect on the materials and in other respects it has little effect. For example, the pepper materials tend to follow the motion of the table rather closely but rocks, pebbles, leaves and the like tend to shuffle or roll down the table toward the discharge end thereof. Such materials fall over the end of the table 41. However, means are provided for discharging the unwanted materials, at least of a lighter nature, from the machine at this point so that they do not travel any farther therein.

The frame 8 carries a blower fan 56 appropriately driven from the engine 29. An outlet duct 57 from the fan leads to a vaned discharge 58 directed upwardly and rearwardly and extending across a major part of the rear of the vehicle. The blast of air from the discharge around the vanes 58 travels upwardly so that any light material, such as leaves, sticks, twigs, cut stems, even pebbles, small mud balls and the like, is blown outwardly through an opening at the rear of the machine just below the roller 24. It is preferred to provide an adjustment for the size of such opening to make it accommodate different types of debris to be discharged. For that reason there is afforded on a rear wall 61 of the machine a hinged damper 62 having an adjusting rod 63 for setting the damper at any desired angle. In this fashion much of the relatively lighter materials are blown away, although the direction and force of the blast are by no means sufficient to discharge any of the desired peppers.

The table 41 is especially provided with obstructions of a sort designed to interrupt the downward travel of the received pepper portions and connected stem portions in order that the stems may be cut to small lengths not to exceed four inches (by present standards) and to avoid cutting or injuring the pepper portions themselves. For that reason, as particularly shown in FIGS. 2, 3, 4 and 5, the table 41 is furnished an array of selectors. Each of these is like the other so that a description of one applies equally to all. Upstanding from the individual channels 43 of the table 41 at a selected location thereon is a pair of metal plates 66 and 67. Each of these preferably has an out-turned foot 68 receiving fasteners 69 for securing the plate to the channel 43. In addition, the two plates at some point are provided with a bridge 71 to afford extra stiffness. The plates are spaced apart to define a narrow notch 72 and are located on opposite sides of a similar narrow slot 73 formed between them in the plate 43.

Each of the plates 66 and 67 has a special edge contour, in this instance including a plurality of approximately radial notches 74, the individual notches of the plurality being disposed in a fan array. The notches are spaced around the periphery of the plates so as to extend inwardly from the exposed edge 76 thereof. The notches 74 are particularly limited in their width so that while they are somewhat larger than the maximum diameter of a pepper stem portion 7, they are substantially smaller than the established or predetermined, effective diameter of the pepper body portion 6. Thus, a pepper body portion cannot enter into any one of the notches 74 nor even into the notch 72 but the pepper stem portion 7 can readily enter into any of the notches 74 or into the notch 72.

Preferably, the various selectors are disposed on the several channels 43 in an array which is staggered when viewed longitudinally and which is aligned when viewed transversely. The aligned selectors in each transverse row are disposed above one of a number of drive shafts 78 journalled in the side members 42 of the table. Each of the shafts 78 carries a sprocket 79 and in most instances a sprocket 81 also. The various shafts 78 are interconnected by chains 82. All of the shafts are simultaneously driven in the same direction by a hydraulic motor 83 mounted on a bracket 84 on the table 41 and connected by flexible hoses 86 to the power source 28 on the frame 8, the hoses 86 permitting transmission of power even though the table 41 is oscillating.

Figure 4:
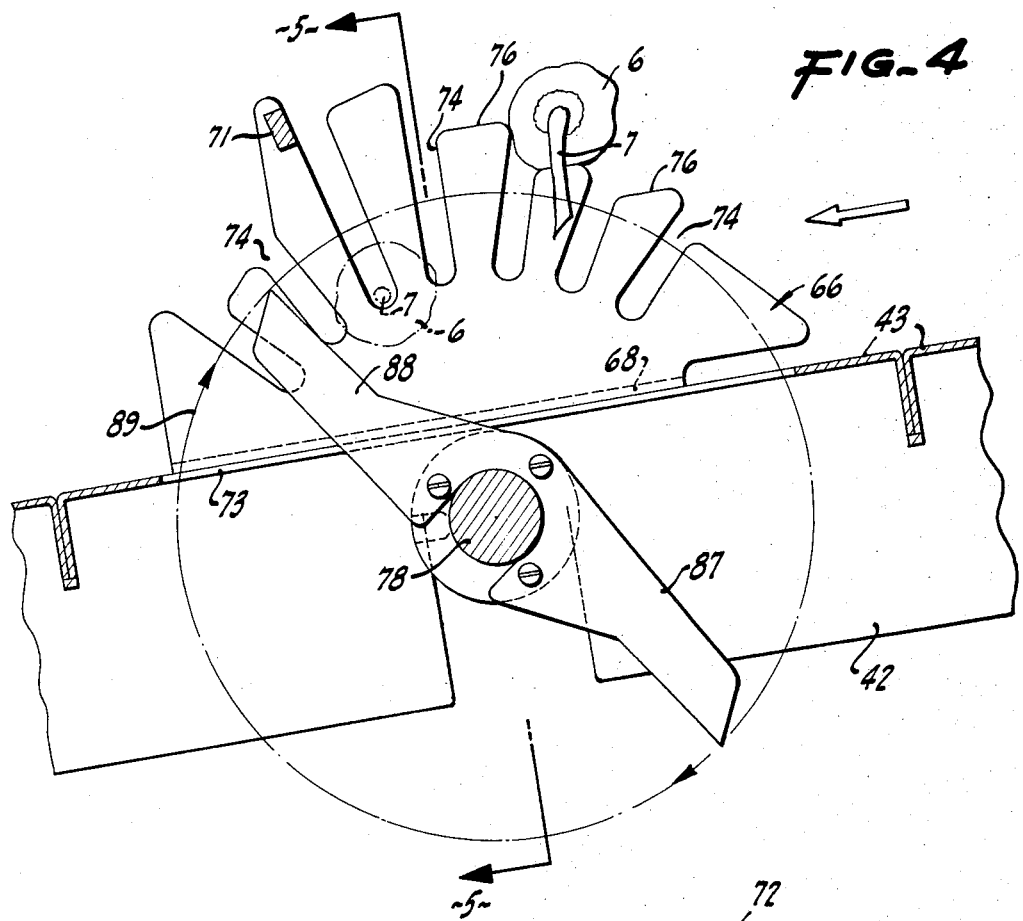
FIG. 4 is a cross-section to an enlarged scale, the plane of which is indicated by the line 4—4 of FIG. 3.
Figure 5:
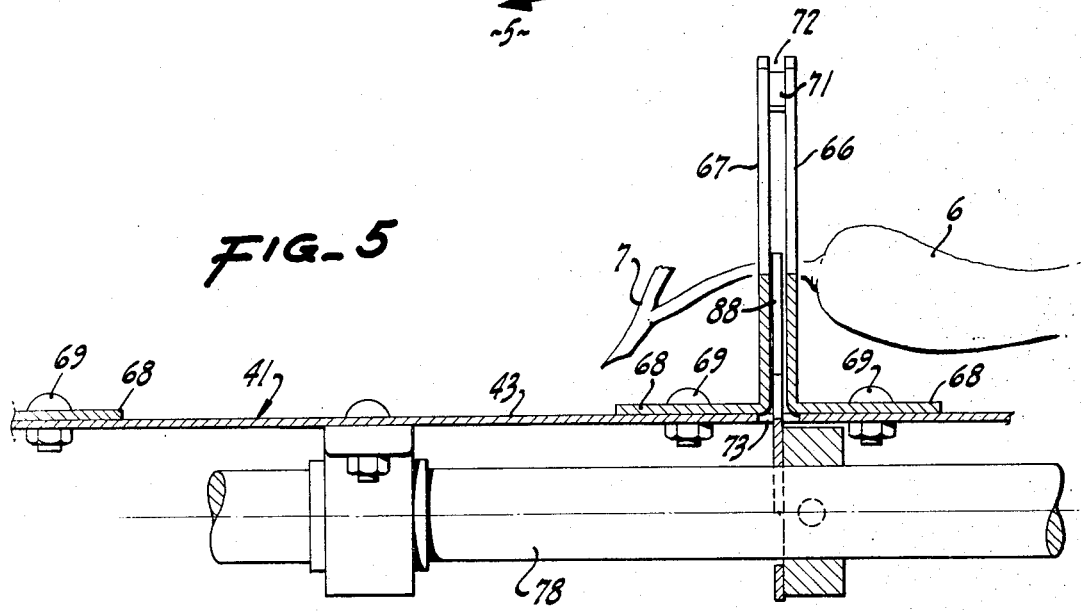
FIG. 5 is a cross-section, the plane of which is indicated by the line 5—5 of FIG. 4.

Mounted on each of the shafts 78 are diametrically opposed knives 87 and 88 arranged to rotate in the direction of the arrow 89 in FIG. 4. The knives 87 and 88 are slightly narrower than the width of the slot 72 so that the knives travel easily between the pairs of plates 66 and 67 and move past the various notches 72 and 74.

In the operation of this structure, the pepper plant portions including the body portions and the stem portions travel irregularly and at random over the table, being advanced partly by gravity, partly by the shaking motion, and partly by interengagement of the upstanding selectors 66 and 67 with the intertwined or transversely arrayed portions of the plants. The shaking motion insures that randomly but nevertheless in a statistically substantially complete fashion various portions of the stems 7 at some time lodge in the notches 72 or in the notches 74 and so are subject to severing by the knives 87 and 88.

While this is transpiring, the pepper portions 6 also tend to strike or encounter or be encountered by the selector plates 66 and 67. The pepper body portions 6 are too large to enter into the notches 72 or the notches 74, being excluded by the edges 76. Thus, the pepper body portions are not injured, even while the stem portions are being severed and shortened.

In addition, the edge configuration of the selector plates 66 and 67 is effective to encounter, engage and strike against the material thereabove. The material is so impelled forcibly toward the discharge end of the table. Eventually, the materials which have been cut and largely divided travel to the lower end of the table 41 and tend to discharge therefrom by gravity and by any residual downward impulse from the selector plates. The lighter portions of such material, particularly severed stems with no pepper portions attached, leaves and the like are blown outwardly through the opening controlled by the damper plate 62.

The heavier portions, including the pepper bodies 6 with short stem portions 7a attached thereto, as well as larger rocks and the like, fall through the blast of air from the outlet 58 and travel within a space at the rear of the machine confined by converging side walls 91. The heavier materials, including the pepper bodies 6, fall onto and are received by a selecting belt 92.

Figure 1:
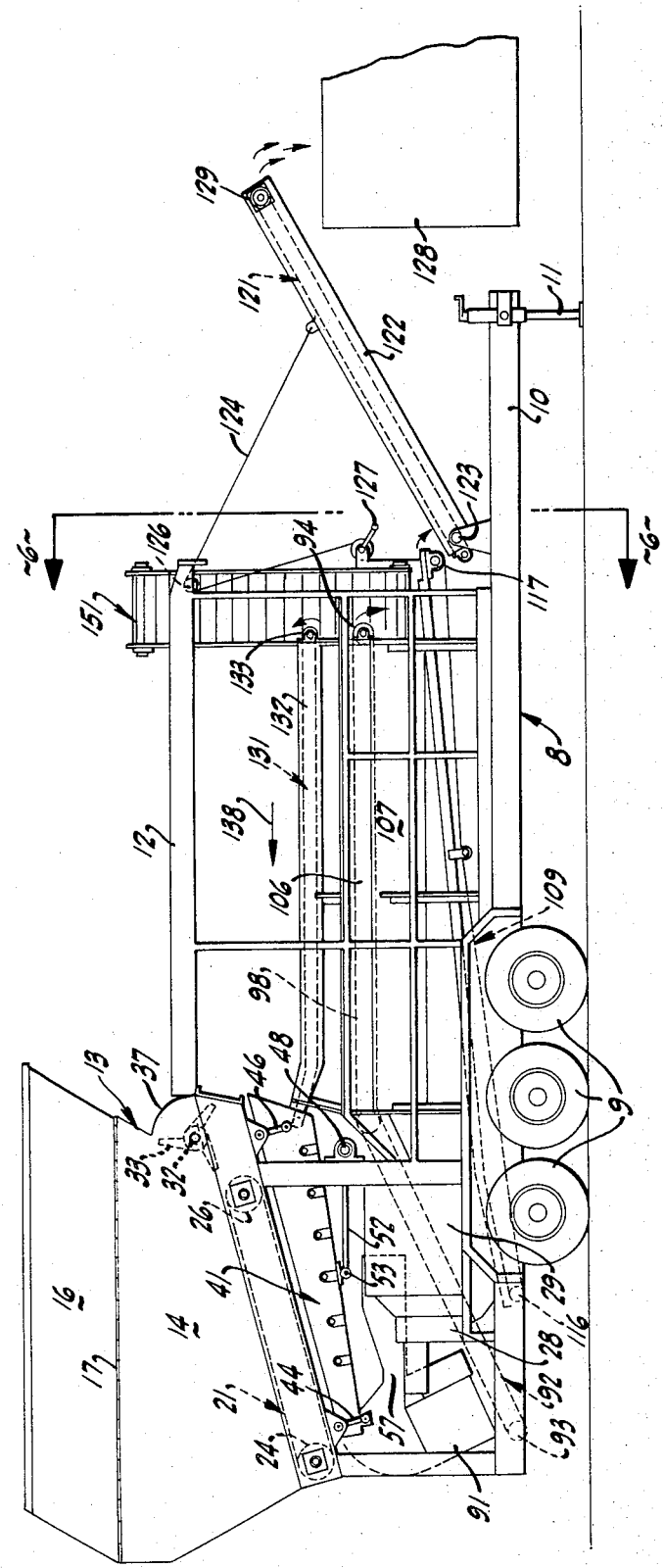
FIG. 1 is a side elevation of a pepper handling machine constructed in accordance with our invention.

As shown particularly in FIGS. 1 and 2, the selecting belt is trained around a number of rollers 93 at the rear portion of the machine and rollers 94 at the forward portion thereof. There are also guide wheels 96 at an intermediate location on the frame 8 and in a position so that the selecting belt has a forwardly and upwardly inclined upper run 97 and a forwardly extending, substantially horizontal portion 98 between the guide rollers 96 and the forward roller 94. The belt is comprised of side chains spanned by a plurality of rubber covered, transversely extending straight rods 99 having small spaces therebetween.

The selecting belt is driven by a hydraulic motor in a direction so that the upper run 97 advances toward the front of the machine, as indicated by the arrow 101 in FIG. 2. Materials falling on the selecting belt at the rear portion of the machine are intercepted thereby if they have a sufficient bulk and are carried upwardly and forwardly. Other materials, such as pebbles, earth, small mud balls and the like, which can fall between the cross rods 99, are permitted to fall through onto the ground. The bulk of the conveyed material travels uphill and rounds the guide wheels 96 and is found on the horizontal portion 98.

Figure 6:
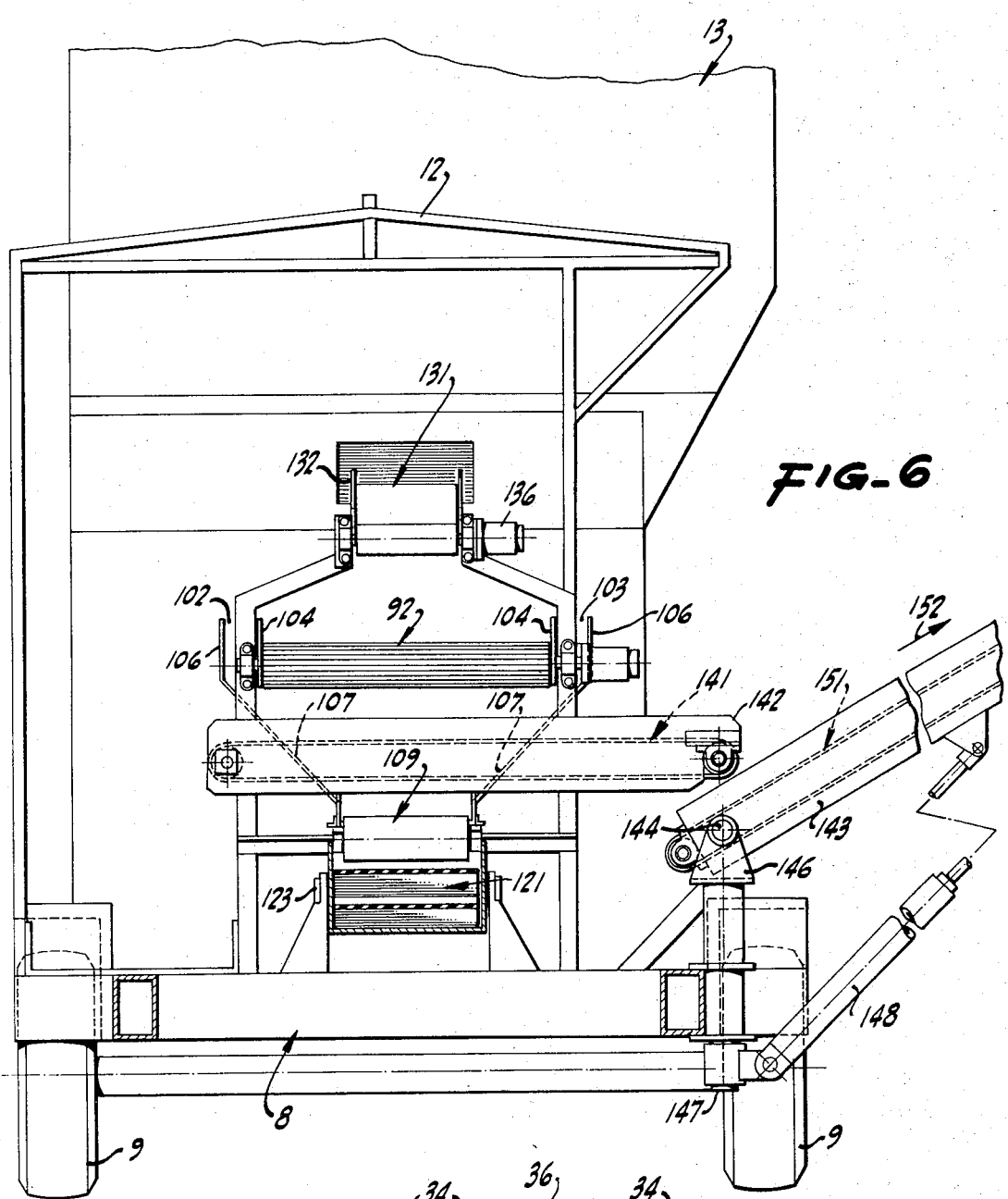
FIG. 6 is a cross-section, the plane of which is indicated by the line 6—6 of FIG. 1.
Figure 7:
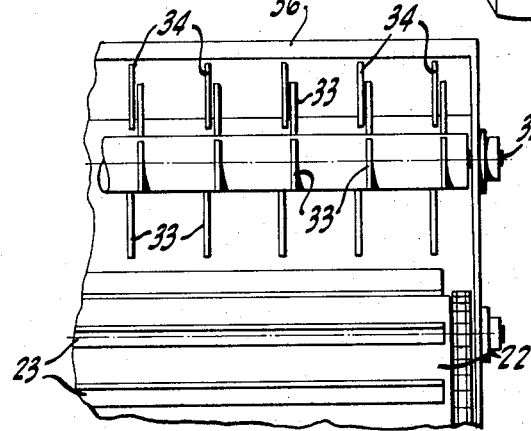
FIG. 7 is a cross-section, the planes of which are indicated by the lines 7—7 of FIG. 2.

As particularly shown in FIG. 6, the width of the selecting belt is approximately half the width of the machine as a whole so that there are provided on opposite sides of the selecting belt stations for operators to stand or sit. The immediate, horizontal sides of the selecting belt are bounded by receiving troughs 102 and 103 defined by side boards 104 and by out boards 106 and inclined deflector panels 107.

Operators standing or sitting either side of the selecting belt remove from the arriving material, by hand, any imperfect product or any leaves, twigs, balls of mud or the like which have gotten that far. The unwanted materials are deposited in the troughs 102 and 103. Such materials fall by gravity downwardly along the deflector walls 107 and at the bottom are received on the upper run 108 of a trash belt 109. This is driven by power to advance upwardly and forwardly in the direction of the arrow 111 in FIG. 2.

The lower portion of the solid trash belt also receives whatever debris has not immediately fallen onto the ground but is shaken out in an advanced area and falls between guard plates 112 and 113. Also deflected into this area by a plate 114 is any debris which happens to fall from the upper portion of the selecting belt. The trash belt is trained around a drum 116 at the rear end and around a drum 117 at the forward end as well as around guide wheels 118 at intermediate stations.

At its forward end the trash belt 109 delivers onto a discharge belt 121 mounted on a discharge frame 122. At its lower end the discharge frame has a pivot mount 123 on the forward portion of the main frame and is sustained by a rigging 124 going around a pulley 126 on the superstructure 12 and terminating at a hand winch 127 on the main frame 8. The discharge frame 122 is thus arranged at any height to discharge appropriately into a trash bin 128. The belt 121 is driven by a hydraulic motor 129 supplied from the power source. In this fashion whatever debris is not immediately blown out of the rear end of the machine or dropped onto the ground is carried upwardly and forwardly, being augmented by whatever trash is discarded by the operators using the selecting belt, and is carried to waste.

Upon occasion, the operators may find on the selecting belt material which, despite the fact that it has arrived on the selecting table, is defective in some fashion. For example, the material may have not only a pepper body but also a pepper stem substantially in excess of 4 inches in length. In that instance the operators deposit such material for recycling onto a return belt 131 mounted on a frame 132 extending generally horizontally above the central portion only of the selecting belt 92. The belt 131 at its forward end is trained around a roller 133 and at its rearward end is trained around a similar roller 134 driven by a hydraulic motor 136. There are guides 137 arranged so that the upper run of the return belt, moving toward the rear of the machine, as shown by the arrow 138 in FIG. 1, discharges at an appropriate elevation onto the upper end of the table 41 so that the return material is put through the same cycle again.

The operators discharge debris from the selecting belt to be carried away on the trash belt ultimately or can recycle selected materials for duplicate or repetitive treatment. That means that the material remaining near the discharge portion of the selecting belt is appropriate for retention and further handling. Material discharging from the selecting table over the forward roller 94 falls by gravity onto a transverse conveyor belt 141 arranged on a short cross frame 142 on the main frame 8. The belt 141 is driven by a hydraulic motor and discharges laterally or transversely onto the receiving end of an elevating frame 143.

The elevating frame at its lower end is connected by pivots 144 to a yoke 146 supported on a pin 147 at one side of the forward portion of the frame 8. The yoke is able to pivot about a vertical axis while the frame 143 is able to pivot about a horizontal axis so that the frame 143 can be variously oriented. The height of the frame is regulated by a hydraulic piston and cylinder assembly 148 supplied under the operator's control with hydraulic fluid from the source 28. For transport of the inactive vehicle on the roadway, the cylinder 148 is appropriately actuated to lower the frame 143 to an acceptable height at its outer end. The frame 143 is then swung from its position, as shown in FIGS. 1 and 6, into a position parallel to the length of the main frame and with the elevator frame 143 alongside of and just below the upper portion of the hopper 13. In this position the conveyor frame 143 is well within roadway height limitations and well within the highway width limitation for the vehicle.

In active use, the elevator frame 143 is extended outwardly and laterally and at an appropriate height. An elevator belt 151 on the frame 143 is hydraulically driven and has its upper run advanced in the direction of the arrow 152 in FIG. 6. The lower end is positioned just below the discharge end of the transverse conveyor belt 141 so that the wanted materials are discharged by gravity onto the upwardly traveling run of the elevator belt 151 and are lifted to a sufficient height and sufficiently far to one side so that they can be discharged by gravity into a receiving truck or the like for hauling to the packing house.

Figure 8:
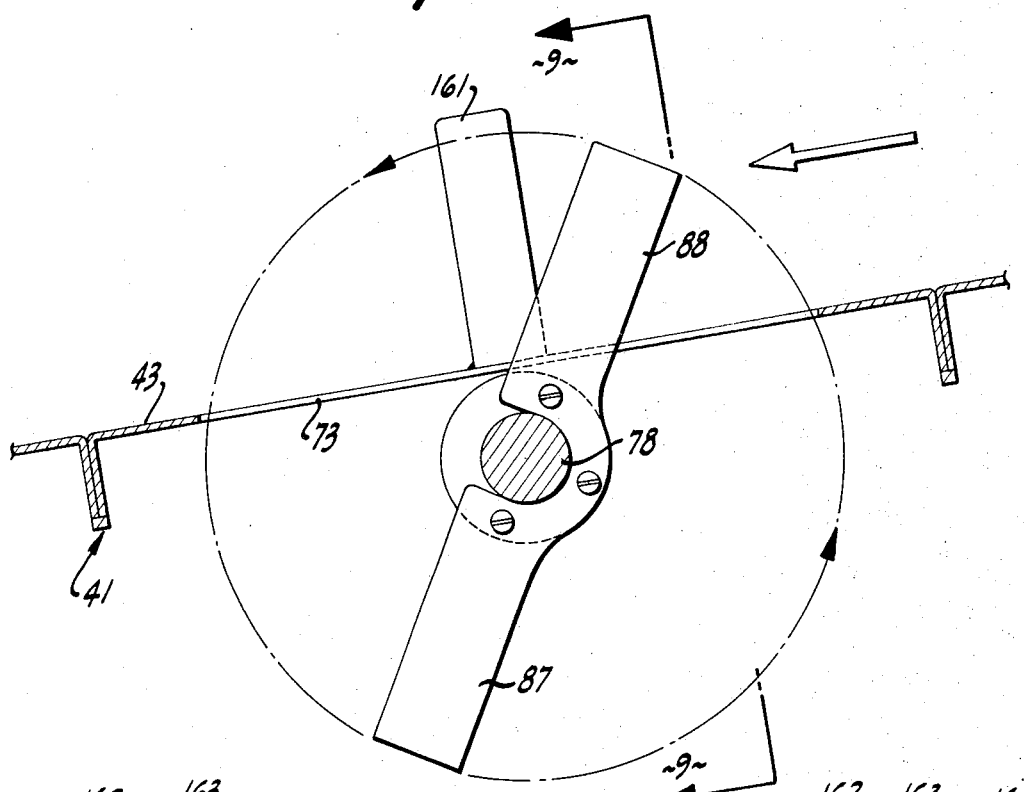
FIG. 8 is a cross-section like FIG. 4 but showing a modified form of selector.
Figure 9:
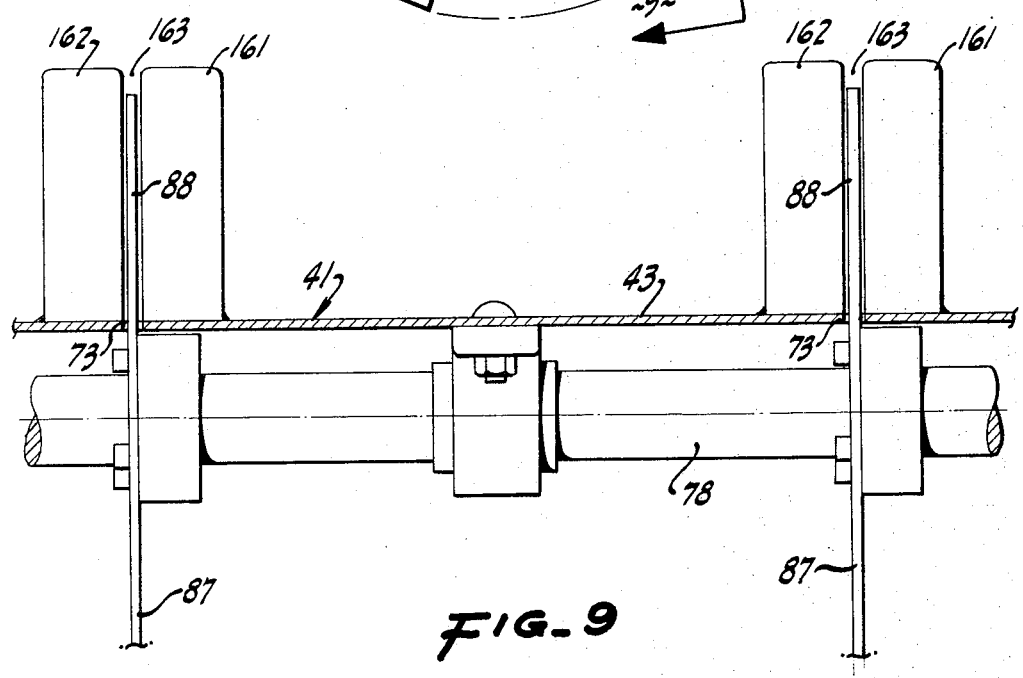
FIG. 9 is a view like FIG. 5 and is a cross-section taken on the line 9—9 of FIG. 8.

While the selector mechanism, including the plates 66 and 67, as shown in FIGS. 1 to 7, is satisfactory for most field conditions, there are occasions, particularly when the field is especially muddy, that an alternate form of selector structure is employed. As particularly shown in FIGS. 8 and 9, the table 41 and its channels 43 and the slots 73 are as before. Also, the shafts 78 carry knife blades 87 and 88, exactly as before, but in some instances the direction of rotation may be reversed. That is easily accomplished by reversing the supply and discharge to the hydraulic driving motor 83. The selector mechanism in this instance, instead of utilizing the plates 66 and 67, rather has on opposite sides of each of the slots 73 at least one pair of upstanding fingers 161 and 162. These are of greater height than the radius of the individual blades and between them define a notch 163. The width of the notch 163 is greater than that of a pepper stem portion 7 but is much less than the predetermined diameter of the pepper body 6.

In this instance the received material travels downwardly on the table, as before, and is partly interrupted by the upstanding fingers 161 and 162. The stem portions 7 tend to lodge cross-wise of the fingers and to be severed by the revolving knives. The fingers are disposed substantially above the shafts 78. The knife direction can be reversed but if so, the knives are sharpened on the opposite edges.

In some instances, with either form of selectors, the knives are revolved quite rapidly, the speed being easily selected by the supply of hydraulic fluid to the hydraulic motor, but in other instances the knives are revolved quite slowly. Experience with green and dried peppers and with different kinds of produce and with different field conditons teaches that it is necessary for the best results to adjust the direction of rotation of the knives and their speed of rotation. This is readily done in the field during operation. It is sometimes the case that mud cakes on the table to a considerable depth. That depth may be sufficient to block some of the notches 74 in the plate version of the selector but the fingers 161 and 162 extend above any ordinary accumulation of mud so that the operation of the finger selector continues despite adverse conditions.

What is claimed is:

1. A machine for handling peppers comprising a frame, a table, means for mounting said table on said frame, a selector upstanding from said table, said selector defining at least one peripheral notch of a size smaller than a pepper body and larger than a pepper stem, means on said frame for supplying randomly a combined pepper body and pepper stem to said selector, a knife, and means on said frame for moving said knife over said selector in position to sever a pepper stem disposed in said notch.

2. A machine as in claim 1 in which said table mounting means supports said table for oscillation.

3. A machine as in claim 2 including means on said frame for oscillating said table.

4. A machine as in claim 1 in which said selector is arranged vertically and is shaped to define a plurality of peripheral notches like said peripheral notch and opening upwardly therein.

5. A machine as in claim 4 in which said notches are arranged fanwise.

6. A machine as in claim 1 in which a plurality of selectors like said selector are arranged on said table in pairs on opposite sides of said knife.

7. A machine as in claim 1 in which said means for moving said knife includes a shaft, and means for mounting said shaft on said table for rotation.

8. A machine as in claim 7 including means on said table for rotating said shaft, a power source on said frame, and flexible means for transmitting power from said source to said rotating means.

9. A machine as in claim 1 in which said supplying means includes a hopper on said frame and having an outlet disposed to discharge onto said table.

10. A machine as in claim 9 including means in said hopper for advancing pepper bodies and stems therein to said outlet.

11. A machine as in claim 9 including means in said hopper adjacent said outlet for severing materials in said hopper advancing through said outlet.

12. A machine as in claim 1 including a selecting belt on said frame and at least in part below said table to define a cleaning space therebetween.

13. A machine as in claim 12 including an air blower on said frame disposed to discharge a current of air through said cleaning space.

14. A machine as in claim 12 in which said selecting belt has at least a part thereof mounted horizontally on said frame to constitute a selecting table.

15. A machine as in claim 14 including a return belt mounted on said frame partially overlying the horizontal part of said selector belt and extending to a position partially overlying said table.

16. A machine as in claim 12 including a trash belt on said frame below said selector belt.